(12) United States Patent
Yamamoto

(10) Patent No.: US 12,216,315 B2
(45) Date of Patent: Feb. 4, 2025

(54) PROTRUSION DAM-PROTECTED REFLECTING METAL FILMS IN A SUBSTRATE-SUPPORTED OPTICAL WAVEGUIDE, AND OPTICAL COMMUNICATION DEVICE

(71) Applicant: SHINKO ELECTRIC INDUSTRIES CO., LTD., Nagano (JP)

(72) Inventor: Kazunao Yamamoto, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 293 days.

(21) Appl. No.: 18/068,745

(22) Filed: Dec. 20, 2022

(65) Prior Publication Data

US 2023/0221506 A1 Jul. 13, 2023

(30) Foreign Application Priority Data

Jan. 7, 2022 (JP) .................................. 2022-001649

(51) Int. Cl.
*G02B 6/42* (2006.01)

(52) U.S. Cl.
CPC .................................. *G02B 6/4214* (2013.01)

(58) Field of Classification Search
CPC ........ G02B 6/4214; G02B 6/138; G02B 6/43; G02B 2006/12104
See application file for complete search history.

(56) References Cited

U.S. PATENT DOCUMENTS

| | | | | |
|---|---|---|---|---|
| 6,684,007 B2* | 1/2004 | Yoshimura | ............... | G02B 6/43 |
| | | | | 257/E25.032 |
| 6,999,643 B2* | 2/2006 | Kikuchi | ................. | G02B 6/138 |
| | | | | 385/91 |
| 8,639,067 B2* | 1/2014 | Matsuoka | ............ | H05K 1/0274 |
| | | | | 385/39 |
| 8,942,520 B2* | 1/2015 | Matsuoka | ................. | G02B 6/43 |
| | | | | 438/24 |
| 9,081,159 B2* | 7/2015 | Yanagisawa | ............. | G02B 6/43 |
| 2002/0028045 A1* | 3/2002 | Yoshimura | .......... | H01L 23/5389 |
| | | | | 385/39 |
| 2003/0128907 A1* | 7/2003 | Kikuchi | .................... | G02B 6/42 |
| | | | | 264/1.24 |
| 2009/0080846 A1* | 3/2009 | Shao | .................... | G02B 6/1221 |
| | | | | 427/163.2 |

(Continued)

FOREIGN PATENT DOCUMENTS

JP 2009-069668 4/2009

*Primary Examiner* — Andrew Jordan
(74) *Attorney, Agent, or Firm* — IPUSA, PLLC

(57) ABSTRACT

An optical waveguide on a wiring substrate includes a first cladding layer, a first metallic film forming protrusion formed on the first cladding layer and including an inclined surface inclined with respect to an upper surface of the first cladding layer, a first metallic film formed on at least the inclined surface, a core layer formed on the first cladding layer so as to cover a portion of the first metallic film, a second cladding layer formed on the first cladding layer, so as to cover at least an upper surface and both side surfaces of the core layer, and a pair of first protrusions formed on the first cladding layer with the core layer interposed therebetween in a plan view and protruding from the first cladding layer, so as to be separated from the core layer and the first metallic film forming protrusion.

13 Claims, 10 Drawing Sheets

(56) References Cited

U.S. PATENT DOCUMENTS

| | | | |
|---|---|---|---|
| 2009/0080847 A1* | 3/2009 | Shao | G02B 6/1221 |
| | | | 427/163.2 |
| 2009/0074354 A1 | 5/2009 | Yanagisawa | |
| 2009/0304323 A1* | 12/2009 | Matsubara | G02B 6/43 |
| | | | 264/1.24 |
| 2011/0052118 A1* | 3/2011 | Matsuoka | H05K 1/0274 |
| | | | 385/14 |
| 2012/0134632 A1* | 5/2012 | Yamamoto | B29D 11/00663 |
| | | | 264/1.27 |
| 2012/0155822 A1* | 6/2012 | Yanagisawa | G02B 6/4214 |
| | | | 385/130 |
| 2012/0213470 A1* | 8/2012 | Matsuoka | G02B 6/43 |
| | | | 264/1.24 |
| 2023/0221506 A1* | 7/2023 | Yamamoto | G02B 6/4214 |
| | | | 385/31 |

\* cited by examiner

PROTRUSION DAM-PROTECTED REFLECTING METAL FILMS IN A SUBSTRATE-SUPPORTED OPTICAL WAVEGUIDE, AND OPTICAL COMMUNICATION DEVICE

CROSS-REFERENCE TO RELATED APPLICATIONS

This application is based upon and claims priority to Japanese Patent Application No. 2022-001649, filed on Jan. 7, 2022, the entire contents of which are incorporated herein by reference.

FIELD

Certain aspects of the embodiments discussed herein are related to substrates with optical waveguides, optical communication devices, and methods for manufacturing substrates with optical waveguides.

BACKGROUND

In a substrate with an optical waveguide having a core layer sandwiched between a first cladding layer and a second cladding layer, there is known a technique to form an inclined surface that is inclined at approximately 45 degrees with respect to a light propagation direction of the core layer, and to provide a metallic film on the inclined surface. In this optical waveguide, the core layer or the like is formed by exposing and developing a photosensitive resin.

An example of a substrate with an optical waveguide is proposed in Japanese Laid-Open Patent Publication No. 2009-69668, for example.

However, in the substrate with the optical waveguide described above, the core layer is exposed and developed after forming the metallic film. For this reason, there is a problem in that the metallic film may become stripped or detached by a developer that is used when developing the core layer.

SUMMARY

Accordingly, it is an object in one aspect of the embodiments to provide a substrate with an optical waveguide having a structure capable of preventing a metallic film from easily becoming stripped or detached.

According to one aspect of the embodiments, a substrate with optical waveguide includes a wiring substrate; and an optical waveguide formed on the wiring substrate, wherein the optical waveguide includes a first cladding layer, a first metallic film forming protrusion, formed on an upper surface of the first cladding layer, and including an inclined surface that is inclined with respect to the upper surface of the first cladding layer, a first metallic film formed on at least the inclined surface of the first metallic film forming protrusion, a core layer formed on the upper surface of the first cladding layer so as to cover a portion of the first metallic film, a second cladding layer formed on the upper surface of the first cladding layer, so as to cover at least an upper surface and both side surfaces of the core layer, and a pair of first protrusions, formed on the upper surface of the first cladding layer with the core layer interposed therebetween in a plan view, and protruding from the upper surface of the first cladding layer, so as to be separated from the core layer and the first metallic film forming protrusion, wherein the core layer and the pair of first protrusion are formed of a photosensitive resin, the first metallic film forming protrusion includes a first central portion overlapping the core layer in the plan view, a first wide portion extending from the first central portion and protruding from one side surface of the core layer, and a second wide portion extending from the first central portion and protruding from the other side surface of the core layer, and when the first metallic film is viewed in a direction perpendicular to an end surface of the core layer, the core layer overlaps the first metallic film formed at the first central portion, and one of the pair of first protrusions includes a portion overlapping the first metallic film formed at the first wide portion, and the other of the pair of first protrusions includes a portion overlapping the first metallic film formed at the second wide portion.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1A:
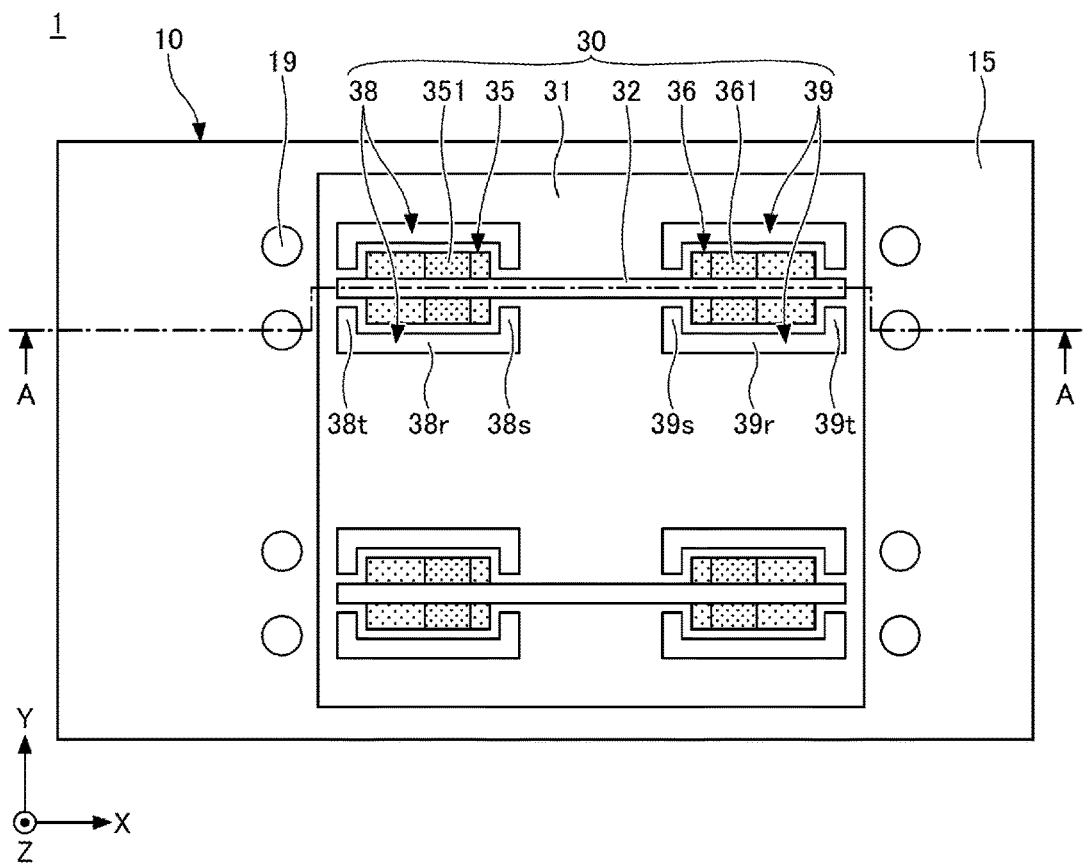
FIG. 1A and FIG. 1B are diagrams illustrating an example of a structure of a substrate with an optical waveguide according to a first embodiment.

Preferred embodiments of the present invention will be described with reference to the accompanying drawings. In the drawings, those parts that are the same are designated by the same reference numerals, and a repeated description of the same parts may be omitted.

First Embodiment

[Structure of Substrate with Optical Waveguide]

Figure 1B:
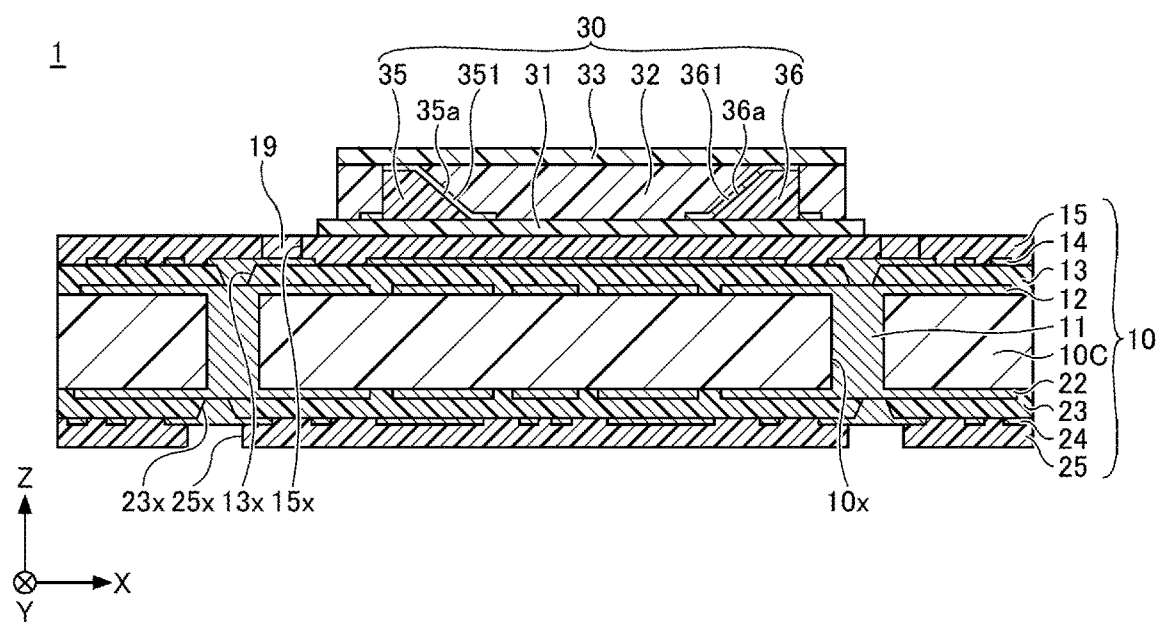

First, a structure of a substrate with an optical waveguide will be described. FIG. 1A and FIG. 1B are diagrams illustrating an example of the structure of the substrate with the optical waveguide according to a first embodiment. FIG. 1A is a plan view, and FIG. 1B is a cross sectional view along a line A-A in FIG. 1A. In FIG. 1A, the illustration of a second cladding layer 33 illustrated in FIG. 1B is omitted. In FIG. 1A and FIG. 1B, directions are defined with reference to an XYZ coordinate system, for example. An X-direction, a Y-direction, and a Z-direction that are perpendicular to one another. In FIG. 2A through FIG. 10 which follow, the directions may be defined in a similar manner, as required.

As illustrated in FIG. 1A and FIG. 1B, a substrate 1 with optical waveguide according to the first embodiment, includes a wiring substrate 10, and an optical waveguide 30 formed on the wiring substrate 10. In this example, it is assumed for the sake of convenience that the wiring substrate 10 has a planar shape that is rectangular, a long side of the rectangular shape is parallel to the X-direction, and a short side of the rectangular shape is parallel to the Y-direction. Various layers forming the wiring substrate 10 are laminated in a laminating direction that is parallel to the Z-direction.

[Wiring Substrate]

In the wiring substrate 10, interconnect layers and insulating layers are laminated on both surfaces (that is, upper and lower surfaces in FIG. 1B) of a core substrate 10C. More particularly, in the wiring substrate 10, an interconnect layer 12, an insulating layer 13, an interconnect layer 14, and a solder resist layer 15 are successively laminated on one surface (upper surface) of the core substrate 10C. Further, an interconnect layer 22, an insulating layer 23, an interconnect layer 24, and a solder resist layer 25 are successively laminated on the other (lower surface) of the core substrate 10C.

For example, a so-called glass epoxy substrate or the like, obtained by impregnating glass cloth with an insulating resin, such as an epoxy-based resin or the like, can be used as the core substrate 10C. A substrate obtained by impregnating a woven or nonwoven fabric of glass fiber, carbon fiber, aramid fiber, or the like with an epoxy resin, a polyimide resin, or the like, can also be used as the core substrate 10C. The core substrate 10C may have a thickness in a range of approximately 60 μm to approximately 400 μm, for example. The core substrate 10C is provided with through holes 10x penetrating the core substrate 10C in a thickness direction thereof. The through hole 10x has a planar shape that is circular, for example.

The interconnect layer 12 is formed on one surface of the core substrate 10C. On the other hand, the interconnect layer 22 is formed on the other surface of the core substrate 10C. The interconnect layer 12 and the interconnect layer 22 are electrically connected to each other through via interconnects 11 formed in the through holes 10x, respectively. Each of the interconnect layers 12 and 22 is patterned into a predetermined planar shape. A material that is used for the interconnect layers 12 and 22 and the via interconnect 11 may be copper (Cu) or the like, for example. The interconnect layers 12 and 22 may have a thickness in a range of approximately 10 μm to approximately 30 μm, for example. The interconnect layer 12, the interconnect layer 22, and the via interconnect 11 may be integrally formed.

The insulating layer 13 is formed on the one surface of the core substrate 10C, so as to cover the interconnect layer 12. A material that is used for the insulating layer 13 may be an insulating resin or the like including an epoxy-based resin or a polyimide-based resin as a main component thereof, for example. The insulating layer 13 may have a thickness in a range of approximately 30 μm to approximately 40 μm, for example. The insulating layer 13 may include a filler, such as silica ($SiO_2$) or the like, for example.

The interconnect layer 14 is formed on one surface of the insulating layer 13. The interconnect layer 14 includes via interconnects, filling an inside of via holes 13x penetrating the insulating layer 13 and exposing one surface of the interconnect layer 12, and an interconnect pattern formed on the one surface of the insulating layer 13. The interconnect layer 14 is electrically connected to the interconnect layer 12. The via hole 13x may be a cavity having an inverted truncated cone shape, and a diameter of an opening of the cavity at one end which opens to the solder resist layer 15 is greater than a diameter of an opening of the cavity at the other end (that is, a bottom surface of the cavity) formed by the one surface of the interconnect layer 12. A material that is used for the interconnect layer 14, and a thickness of the interconnect pattern forming the interconnect layer 14, may be the same as those of the interconnect layer 12, for example.

The solder resist layer 15 is an outermost layer on one side of the wiring substrate 10, and is formed on the one surface of the insulating layer 13, so as to cover the interconnect layer 14. The solder resist layer 15 may be formed of a photosensitive resin or the like, such as an epoxy-based resin, an acrylic-based resin, or the like, for example. The solder resist layer 15 may have a thickness in a range of approximately 15 μm to approximately 35 μm, for example.

The solder resist layer 15 includes openings 15x, and a portion of one surface of the interconnect layer 14 is exposed at the bottom of the openings 15x. The opening 15x may have a planar shape that is circular, for example. A metallic film may be formed on the one surface of the interconnect layer 14 exposed inside the opening 15x, or the one surface of the interconnect layer 14 may be subjected to an anti-oxidation treatment, such as an organic solderability preservative (OSP) treatment or the like, as required. Examples of the metallic film include a Au layer, a Ni/Au layer (that is, a metallic film in which a Ni layer and a Au layer are laminated in this order), a Ni/Pd/Au layer (that is, a metallic film in which a Ni layer, a Pd layer, and a Au layer are laminated in this order), or the like.

External connection terminals 19 are formed on the interconnect layer 14 exposed inside the openings 15x. The external connection terminals 19 may be solder bumps, for example. A solder material, such as an alloy containing Pb, an alloy of Sn and Cu, an alloy of Sn and Sb, an alloy of Sn and Ag, or an alloy of Sn, Ag, and Cu, or the like can be used for the solder bumps, for example. The external connection terminals 19 are terminals to be electrically connected to a light emitting element or a light receiving element, for example.

The insulating layer 23 is formed on the other surface of the core substrate 10C, so as to cover the interconnect layer 22. A material that is used for the insulating layer 23, and a thickness of the insulating layer 23, may be the same as those of the insulating layer 13, for example. The insulating layer 23 may include a filler, such as silica ($SiO_2$) or the like, for example. The interconnect layer 24 is formed on the other side of the insulating layer 23. The interconnect layer 24 includes via interconnects, filling an inside of via holes 23x penetrating the insulating layer 23 and exposing one surface of the interconnect layer 22, and an interconnect pattern formed on the one surface of the insulating layer 23. The interconnect layer 24 is electrically connected to the interconnect layer 22. The via hole 23x may be a cavity having an inverted truncated cone shape, and a diameter of an opening of the cavity at one end which opens to the solder resist layer 25 is greater than a diameter of an opening of the cavity at the other end (that is, a bottom surface of the cavity) formed by the one surface of the interconnect layer 22. A material that is used for the interconnect layer 24, and a thickness of the interconnect pattern forming the interconnect layer 24, may be the same as those of the interconnect layer 12, for example.

The solder resist layer 25 is an outermost layer on the other side of the wiring substrate 10, and is formed on the other surface of the insulating layer 23, so as to cover the interconnect layer 24. A material that is used for the solder resist layer 25, and a thickness of the solder resist layer 25, may be the same as those of the solder resist layer 15. The solder resist layer 25 includes openings 25x, and a portion of the other surface of the interconnect layer 24 is exposed inside the openings 25x. The opening 25x may have a planar shape that is circular, for example. The interconnect layer 24 exposed inside the opening 25x can be used as a pad to be electrically connected to a mounting substrate (not illustrated) or the like, such as a motherboard or the like, for example. The metallic film described above may be formed on the other surface of the interconnect layer 24 exposed inside the opening 25x, or the other surface of the interconnect layer 24 may be subjected to the anti-oxidation treatment described above, such as the OSP treatment or the like, as required.

[Optical Waveguide]

Figure 2A:
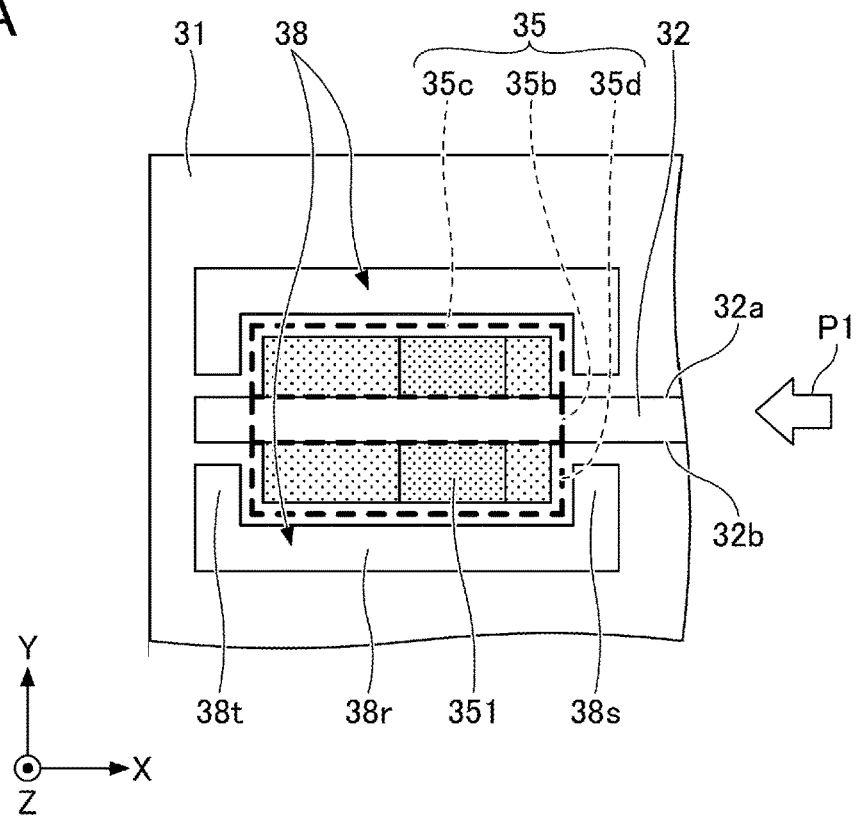
FIGS. 2A and 2B are partial plan views on an enlarged scale illustrating first and second metallic film forming protrusions and vicinities thereof.
Figure 2B:
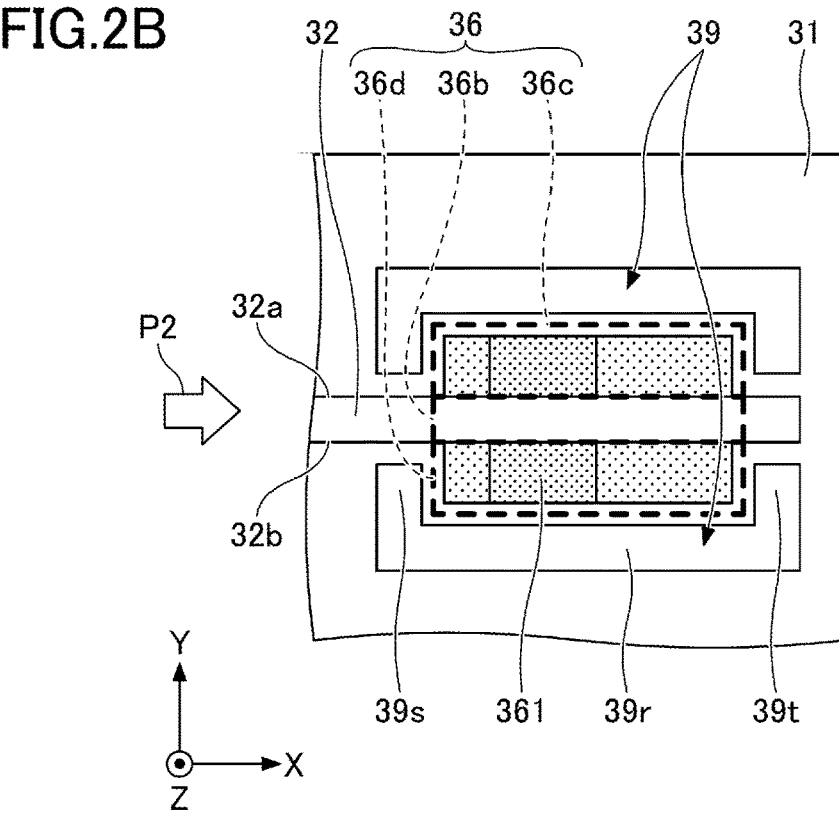

FIGS. 2A and 2B are partial plan views on an enlarged scale illustrating first and second metallic film forming protrusions and vicinities thereof. The optical waveguide 30 will be described with reference to FIG. 2A and FIG. 2B, in addition to FIG. 1A and FIG. 1B.

The optical waveguide 30 is formed on the solder resist layer 15 of the wiring substrate 10. The optical waveguide 30 includes a first cladding layer 31, a core layer 32, a second cladding layer 33, a first metallic film forming protrusion 35, a second metallic film forming protrusion 36, a pair of first protrusions 38, a pair of second protrusions 39, a first metallic film 351, and a second metallic film 361.

The first cladding layer 31 is formed of a photosensitive material, for example. More particularly, the first cladding layer 31 can be formed of a polymer, such as a polyimide-based resin, an acrylic-based resin, an epoxy-based resin, a polyolefin-based resin, a polynorbornene-based resin, or the like, for example. The first cladding layer 31 may have a thickness in a range of approximately 10 μm to approximately 30 μm, for example. The first cladding layer 31 is disposed on the wiring substrate 10, so as to be approximately parallel to the wiring substrate 10.

The core layer 32 is selectively formed on an upper surface of the first cladding layer 31. The core layer 32 covers a portion of the first metallic film 351, and a portion of the second metallic film 361. In the example illustrated in FIG. 1A and FIG. 1B, two core layers 32 are elongated in a longitudinal direction, that is, the X-direction, and the two elongated core layers 32 are arranged side by side on the upper surface of the first cladding layer 31. However, this arrangement is merely an example, and one core layer 32 may be formed, or three or more core layers 32 may be formed, as appropriate. A pitch of the core layers 32 arranged side by side may be in a range of approximately 200 μm to approximately 300 μm, for example. A material that is used for the core layer 32 may be the same as that of the first cladding layer 31. The core layer 32 may have a thickness in a range of approximately 15 μm to approximately 35 μm, for example. A cross sectional shape of the core layer 32 along a short (or lateral) direction perpendicular to the longitudinal direction may be square, for example.

The second cladding layer 33 is formed on the upper surface of the first cladding layer 31, so as to cover at least the upper surface and both side surfaces of the core layer 32. A material that is used for the second cladding layer 33 may be the same as that of the first cladding layer 31. The second cladding layer 33 may have a thickness in a range of approximately 10 μm to approximately 30 μm, for example.

As described above, the first cladding layer 31, the core layer 32, and the second cladding layer 33 can be formed of the same material, but a refractive index of the core layer 32 is higher than refractive indexes of the first cladding layer 31 and the second cladding layer 33. The refractive index of the core layer 32 can be made higher than the refractive indexes of the first cladding layer 31 and the second cladding layer 33, by including a refractive index controlling additive, such as Ge or the like, in the core layer 32. The refractive indexes of the first cladding layer 31 and the second cladding layer 33 can be set to 1.5, for example, and the refractive index of the core layer 32 can be set to 1.6, for example.

The first metallic film forming protrusion 35 is formed on the upper surface of the first cladding layer 31. The first metallic film forming protrusion 35 has an inclined surface 35a that is inclined with respect to the upper surface of the first cladding layer 31. An angle that is formed between the upper surface of the first cladding layer 31 and the inclined surface 35a is 45 degrees, for example. The first metallic film forming protrusion 35 may include a surface parallel to or perpendicular to the upper surface of the first cladding layer 31, in addition to the inclined surface 35a.

As illustrated in FIG. 2A, the first metallic film forming protrusion 35 includes, in a plan view, a first central portion 35b overlapping the core layer 32, a first wide portion 35c extending from the first central portion 35b and protruding in the +Y-direction from one side surface 32a of the core layer 32, and a second wide portion 35d extending from the first central portion 35b and protruding in the −Y-direction from the other side surface 32b of the core layer 32. The inclined surface 35a spans the first central portion 35b, the first wide portion 35c, and the second wide portion 35d.

The second metallic film forming protrusion 36 is formed on the upper surface of the first cladding layer 31. The second metallic film forming protrusion 36 has an inclined surface 36a that is inclined with respect to the upper surface of the first cladding layer 31. An angle that is formed between the upper surface of the first cladding layer 31 and the inclined surface 36a is 45 degrees, for example. The second metallic film forming protrusion 36 may include a surface parallel to or perpendicular to the upper surface of the first cladding layer 31, in addition to the inclined surface 36a.

As illustrated in FIG. 2B, the second metallic film forming protrusion 36 includes a second central portion 36b overlapping the core layer 32, a third wide portion 36c extending from the second central portion 36b and protruding in the +Y-direction from the one side surface 32a of the core layer 32, and a fourth wide portion 36d extending from the second central portion 36b and protruding in the −Y-direction from the other side surface 32b of the core layer 32.

The inclined surface 36a spans the second central portion 36b, the third wide portion 36c, and the fourth wide portion 36d.

The first metallic film 351 is formed on at least the inclined surface 35a of the first metallic film forming protrusion 35. At the inclined surface 35a, the first metallic film 351 is formed on the first central portion 35b covered with the core layer 32, and is exposed from the core layer 32 to extend to the first wide portion 35c and the second wide portion 35d. The second metallic film 361 is formed on at least the inclined surface 36a of the second metallic film forming protrusion 36. At the inclined surface 36a, the second metallic film 361 is formed on the second central portion 36b covered by the core layer 32, and is exposed from the core layer 32 to extend to the third wide portion 36c and the fourth wide portion 36d.

The second metallic film 361 formed on the inclined surface 36a approximately opposes the first metallic film 351 formed on the inclined surface 35a. An interface between the core layer 32 and the first metallic film 351 formed on the first central portion 35b, and an interface between the core layer 32 and the second metallic film 361 formed on the second central portion 36b, serve as reflection surfaces that convert a propagation direction of incident light. The first metallic film 351 and the second metallic film 361 are gold (Au) films having a thickness in a range of 0.2 µm to 0.5 µm, for example.

The pair of first protrusions 38 is formed on the upper surface of the first cladding layer 31 with the core layer 32 interposed therebetween in the plan view, so as to be separated from the core layer 32 and the first metallic film forming protrusion 35. The pair of first protrusions 38 is formed of a photosensitive resin, and protrudes from the upper surface of the first cladding layer 31. Because the pair of first protrusions 38 is separated from the core layer 32 and the first metallic film forming protrusion 35, light passing through the core layer 32 does not leak to the first protrusions 38.

A distance between one of the first protrusions 38 and the core layer 32 and the first wide portion 35c, and a distance between the other of the first protrusions 38 and the core layer 32 and the second wide portion 35d, are preferably in a range of approximately several µm to approximately 200 µm, for example. The distance between one first protrusion 38 and the core layer 32 and the first wide portion 35c, and the distance between the other first protrusion 38 and the core layer 32 and the second wide portion 35d, may be constant or may not be constant. A height of the core layer 32 and a height of the pair of first protrusions 38, with reference to the upper surface of the first cladding layer 31, are the same. The term "same" as used herein includes a case where the height of the pair of first protrusions 38 differs by ±15% or less with respect to the height of the core layer 32. The core layer 32 and the pair of first protrusions 38 may be formed of the same material.

In the pair of first protrusions 38, the one first protrusion 38 is preferably formed along a portion of an outer edge of the first wide portion 35c in the plan view, and the other first protrusion 38 is preferably formed along a portion of an outer edge of the second wide portion 35d in the plan view. In the example illustrated in FIG. 1A through FIG. 2B, the first wide portion 35c and the second wide portion 35d have a rectangular shape in the plan view, the one first protrusion 38 has portions opposing three sides of the rectangular shape of the first wide portion 35c in the plan view, and the other first protrusion 38 has portions opposing three sides of the rectangular shape of the second wide portion 35d in the plan view.

More particularly, each of the first protrusions 38 includes a first portion 38r extending in the X-direction, a second portion 38s extending in the Y-direction continuously from one end of the first portion 38r, and a third portion 38t extending in the Y-direction continuously from the other end of the first portion 38r. In this case, the first portion 38r, the second portion 38s, and the third portion 38t of the one first protrusion 38 oppose the three sides of the rectangular shape of the first wide portion 35c in the plan view, respectively. The first portion 38r, the second portion 38s, and the third portion 38t of the other first protrusion 38 oppose the three sides of the rectangular shape of the second wide portion 35d in the plan view, respectively.

When the first metallic film 351 is viewed in a direction perpendicular to an end surface of the core layer 32 (a direction indicated by an arrow P1 in FIG. 2A), the core layer 32 overlaps the first metallic film 351 formed at the first central portion 35b. In addition, when the first metallic film 351 is viewed in the direction perpendicular to the end surface of the core layer 32, the one first protrusion 38 has a portion overlapping the first metallic film 351 formed at the first wide portion 35c, and the other first protrusion 38 has a portion overlapping the first metallic film 351 formed at the second wide portion 35d.

In the example illustrated in FIG. 1A through FIG. 2B, when the first metallic film 351 is viewed in the direction perpendicular to the end surface of the core layer 32, the second portion 38s of the one first protrusion 38 has a portion overlapping the first metallic film 351 formed on the inclined surface 35a of the first wide portion 35c. Moreover, the second portion 38s of the other first protrusion 38 has a portion overlapping the first metallic film 351 formed on the inclined surface 35a of the second wide portion 35d. In other words, the second portion 38s of the one first protrusion 38 has a portion opposing the first metallic film 351 formed on the inclined surface 35a of the first wide portion 35c, and the second portion 38s of the other first protrusion 38 has a portion opposing the first metallic film 351 formed on the inclined surface 35a of the second wide portion 35d.

The pair of second protrusions 39 is formed on the upper surface of the first cladding layer 31 with the core layer 32 interposed therebetween in the plan view, so as to be separated from the core layer 32 and the second metallic film forming protrusion 36. The pair of second protrusions 39 is formed of a photosensitive resin, and protrudes from the upper surface of the first cladding layer 31. Because the pair of second protrusions 39 are separated from the core layer 32 and the second metallic film forming protrusion 36, light passing through the core layer 32 does not leak to the second protrusions 39.

A distance between one of the second protrusions 39 and the core layer 32 and the third wide portion 36c, and a distance between the other of the second protrusions 39 and the core layer 32 and the fourth wide portion 36d, are preferably in a range of approximately several µm to approximately 200 µm, for example. The distance between one second protrusion 39 and the core layer 32 and the third wide portion 36c, and the distance between the other second protrusion 39 and the core layer 32 and the fourth wide portion 36d, may be constant or may not be constant. A height of the core layer 32 and a height of the pair of second protrusions 39, with reference to the upper surface of the first cladding layer 31, are the same. The term "same" as used herein includes a case where the height of the pair of second protrusions 39 differs by ±15% or less with respect to the height of the core layer 32. The core layer 32 and the pair of second protrusions 39 may be formed of the same material. The pair of second protrusions 39 may have the same shape as the pair of first protrusions 38.

In the pair of second protrusions 39, the one second protrusion 39 is preferably formed along a portion of an outer edge of the third wide portion 36c in the plan view, and the other second protrusion 39 is preferably formed along a portion of an outer edge of the fourth wide portion 36d in the plan view. In the example illustrated in FIG. 1A through FIG. 2B, the third wide portion 36c and the fourth wide portion 36d have a rectangular shape in the plan view, the one second protrusion 39 has portions opposing three sides of the rectangular shape of the third wide portion 36c in the plan view, and the other second protrusion 39 has portions opposing three sides of the rectangular shape of the fourth wide portion 36d in the plan view.

More particularly, each of the second protrusions 39 includes a first portion 39r extending in the X-direction, a second portion 39s extending in the Y-direction continuously from one end of the first portion 39r, and a third portion 39t extending in the Y-direction continuously from the other end of the first portion 39r. In this case, the first portion 39r, the second portion 39s, and the third portion 39t of the one second protrusion 39 oppose the three sides of the rectangular shape of the third wide portion 36c in the plan view, respectively. The first portion 39r, the second portion 39s, and the third portion 39t of the other second protrusion 39 oppose the three sides of the rectangular shape of the fourth wide portion 36d in the plan view, respectively.

When the second metallic film 361 is viewed in a direction perpendicular to the end surface of the core layer 32 (a direction indicated by an arrow P2 in FIG. 2B), the core layer 32 overlaps the second metallic film 361 formed at the second central portion 36b. In addition, when the second metallic film 361 is viewed in the direction perpendicular to the end surface of the core layer 32, the one second protrusion 39 has a portion overlapping the second metallic film 361 formed at the third wide portion 36c, and the other second protrusion 39 has a portion overlapping the second metallic film 361 formed at the fourth wide portion 36d.

In the example illustrated in FIG. 1A through FIG. 2B, when the second metallic film 361 is viewed in a direction perpendicular to the end surface of the core layer 32, the second portion 39s of the one second protrusion 39 has a portion overlapping with the second metallic film 361 formed on the inclined surface 36a of the third wide portion 36c. In addition, the second portion 39s of the other second protrusion 39 has a portion overlapping the second metallic film 361 formed on the inclined surface 36a of the fourth wide portion 36d. In other words, the second portion 39s of the one second protrusion 39 has a portion opposing the second metallic film 361 formed on the inclined surface 36a of the third wide portion 36c, and the second portion 39s of the other second protrusion 39 has a portion opposing the second metallic film 361 formed on the inclined surface 36a of the fourth wide portion 36d.

[Method for Manufacturing Substrate with Optical Waveguide]

Next, a method for manufacturing the substrate 1 with optical waveguide will be described. FIG. 3A through FIG. 7 are diagrams illustrating examples of manufacturing processes of the substrate with optical waveguide according to the first embodiment.

Figure 3A:
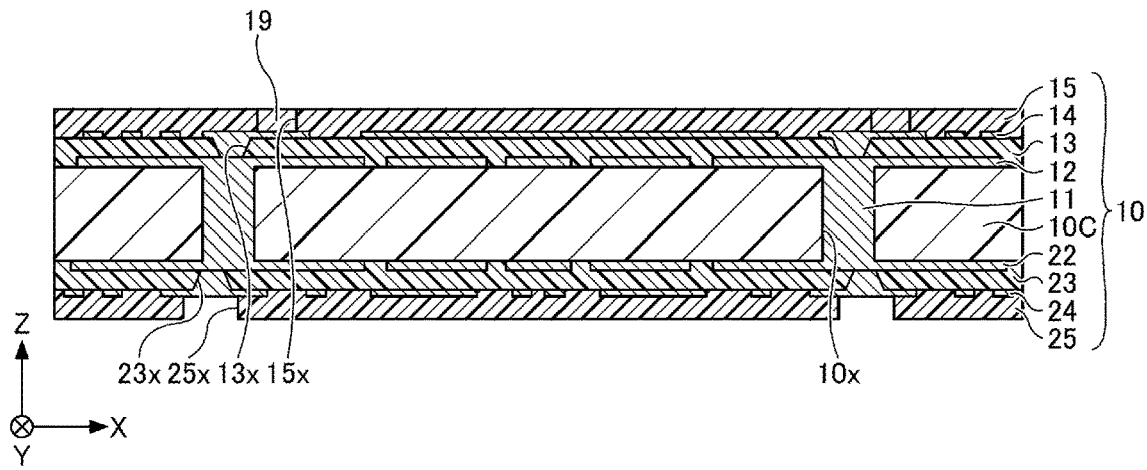
FIG. 3A, FIG. 3B, and FIG. 3C are diagrams (part 1) illustrating an example of manufacturing processes of the substrate with the optical waveguide according to the first embodiment.

First, in a process or step illustrated in FIG. 3A, the wiring substrate 10 is prepared. The wiring substrate 10 can be manufactured by a well known build-up method or the like, for example. The wiring substrate 10 may be prepared by purchasing or the like of a commercially available product.

Figure 3B:
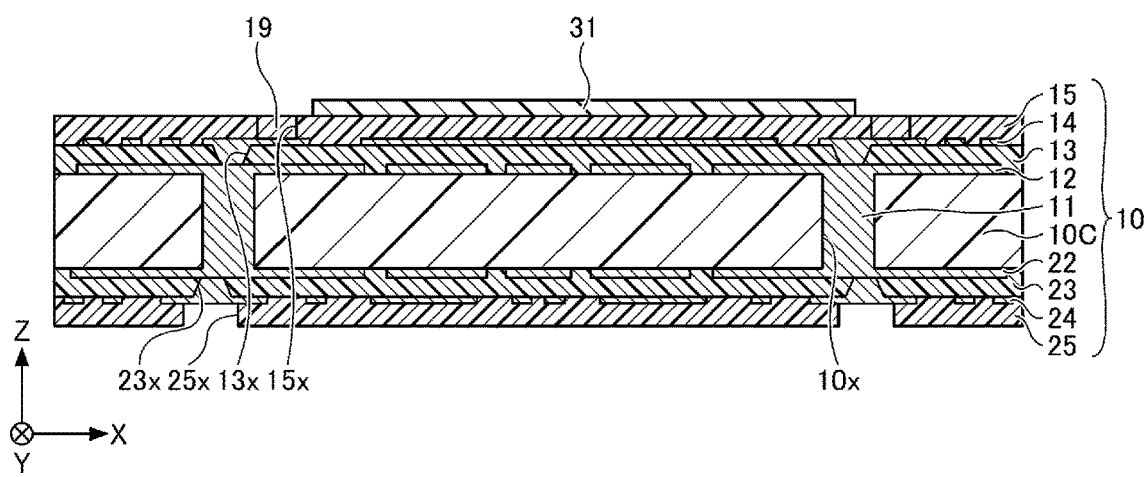
Figure 3C:
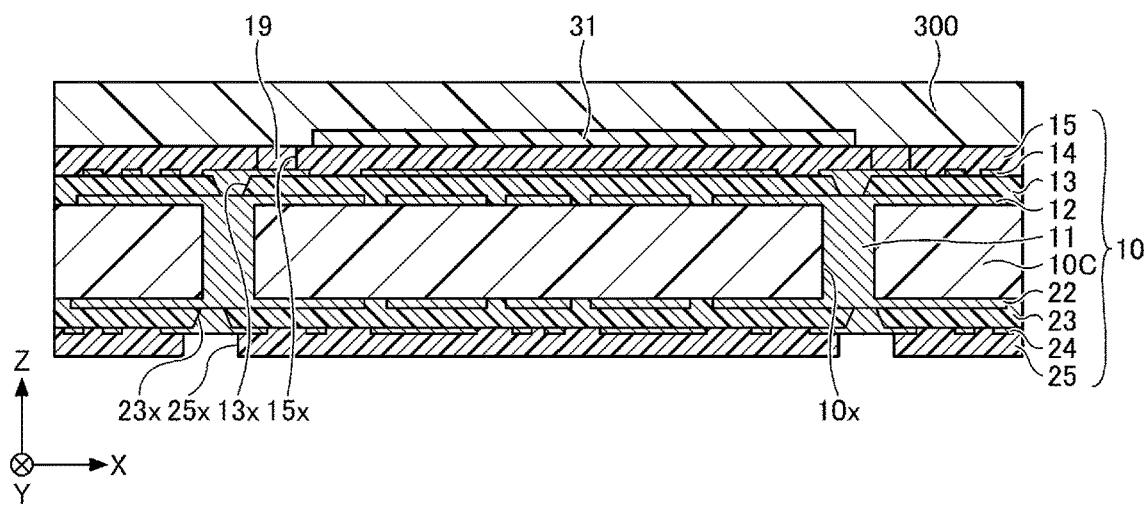

Next, in a process or step illustrated in FIG. 3B, the first cladding layer 31 is formed on the upper surface of the solder resist layer 15 of the wiring substrate 10. The thickness of the first cladding layer 31 is approximately 10 μm, for example. Next, in a process or step illustrated in FIG. 3C, an ultraviolet curing resin 300, covering the first cladding layer 31, is laminated on the upper surface of the solder resist layer 15 of the wiring substrate 10. The thickness of the ultraviolet curing resin 300 is approximately 35 μm, for example.

Figure 4A:
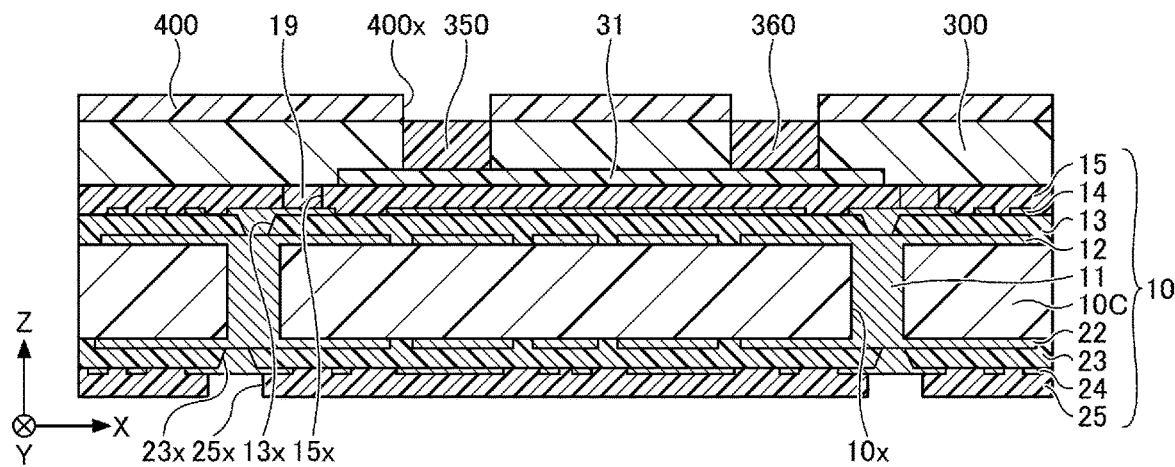
FIG. 4A, FIG. 4B, and FIG. 4C are diagrams (part 2) illustrating the example of the manufacturing processes of the substrate with the optical waveguide according to the first embodiment.
Figure 4B:
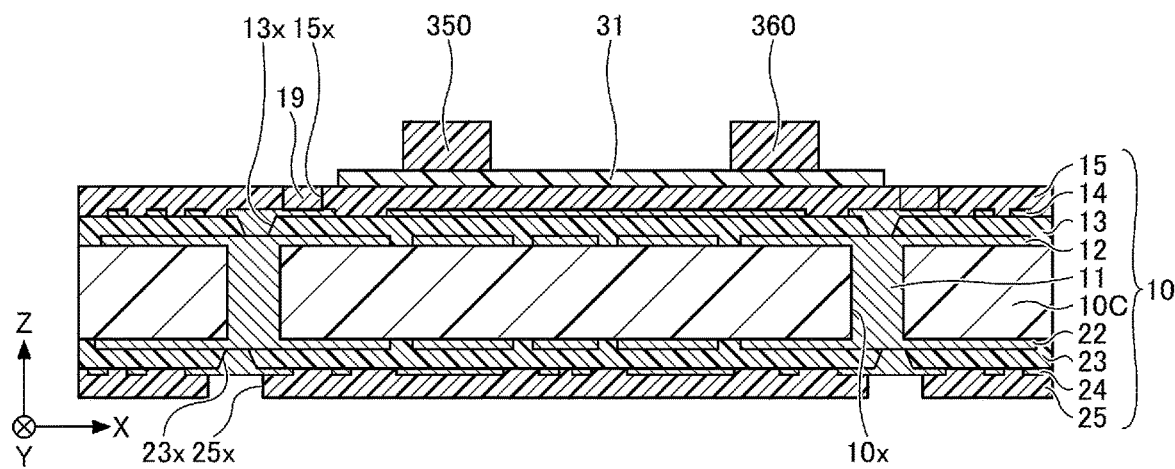

Next, in processes or steps illustrated in FIG. 4A and FIG. 4B, the ultraviolet curing resin 300 is patterned so that only portions where the first metallic film forming protrusion 35 and the second metallic film forming protrusion 36 are to be formed remain. First, as illustrated in FIG. 4A, for example, ultraviolet light is irradiated on the ultraviolet curing resin 300 via a mask 400 having openings 400x at positions corresponding to the portions where the first metallic film forming protrusion 35 and the second metallic film forming protrusion 36 are to be formed, so as to expose and pattern the ultraviolet curing resin 300. As a result, the ultraviolet curing resin 300 exposed inside the openings 400x are cured. Next, in a process or step illustrated in FIG. 4B, unnecessary portions of the ultraviolet curing resin 300 developed and removed, so as to form resin protrusions 350 and 360.

Figure 4C:
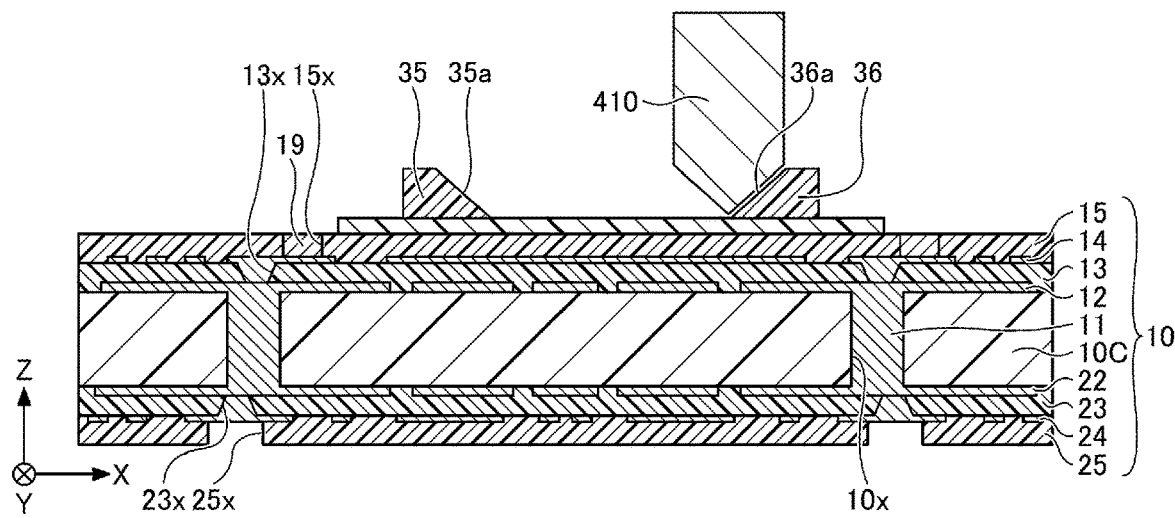

Next, in a process or step illustrated in FIG. 4C, the resin protrusions 350 and 360 are cut at an angle of 45 degrees, for example, so that the cut inclined surfaces of the resin protrusions 350 and 360 approximately oppose each other. The resin protrusions 350 and 360 may be cut by dicing using a dicer blade 410, polishing using a polishing plate, or the like, for example. In a case where a scratch, a dent, or the like is generated on the cut inclined surfaces 35a and 36a during the cutting, the inclined surfaces 35a and 36a are preferably smoothed by irradiating laser light, coating a resin liquid, or the like on the inclined surfaces 35a and 36a.

By the process or step described above, the first metallic film forming protrusion 35 having the inclined surface 35a that is inclined with respect to the upper surface of the first cladding layer 31, and the second metallic film forming protrusion 36 having the inclined surface 36a that is inclined with respect to the upper surface of the first cladding layer 31, are formed. As illustrated in FIG. 2A, in the plan view, the first metallic film forming protrusion 35 has a structure including the first central portion 35b, the first wide portion 35c extending from the first central portion 35b and protruding from one side surface 32a of the core layer 32, and the second wide portion 35d extending from the first central portion 35b and protruding from the other side surface 32b of the core layer 32. As illustrated in FIG. 2B, in the plan view, the second metallic film forming protrusion 36 has a structure including the second central portion 36b, the third wide portion 36c extending from the second central portion 36b and protruding from one side surface 32a of the core layer 32, and the fourth wide portion 36d extending from the second central portion 36b and protruding from the other side surface 32b of the core layer 32.

Figure 5A:
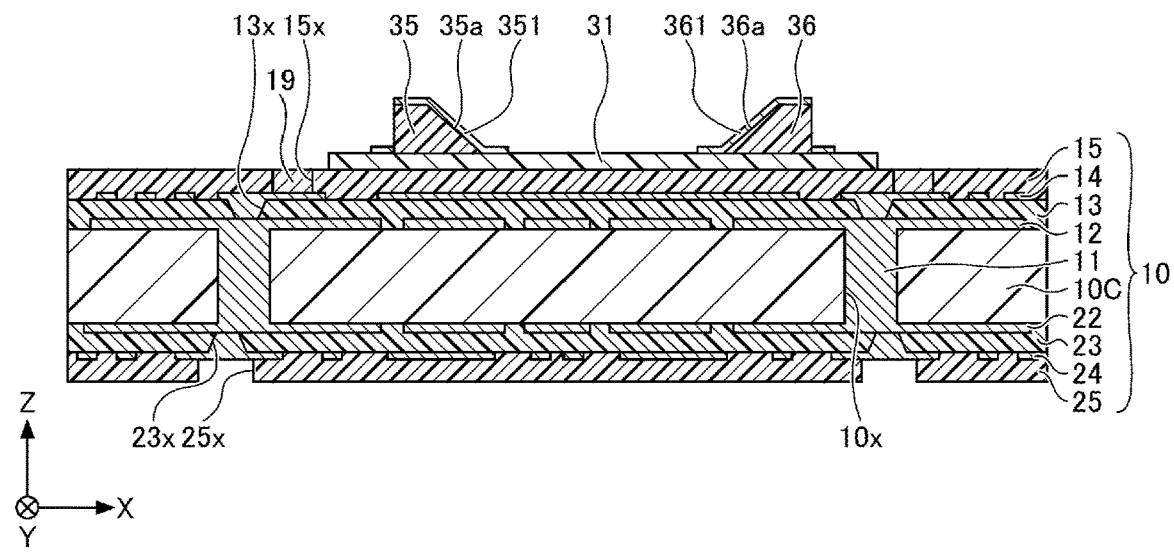
FIG. 5A and FIG. 5B are diagrams (part 3) illustrating the example of the manufacturing processes of the substrate with the optical waveguide according to the first embodiment.
Figure 5B:
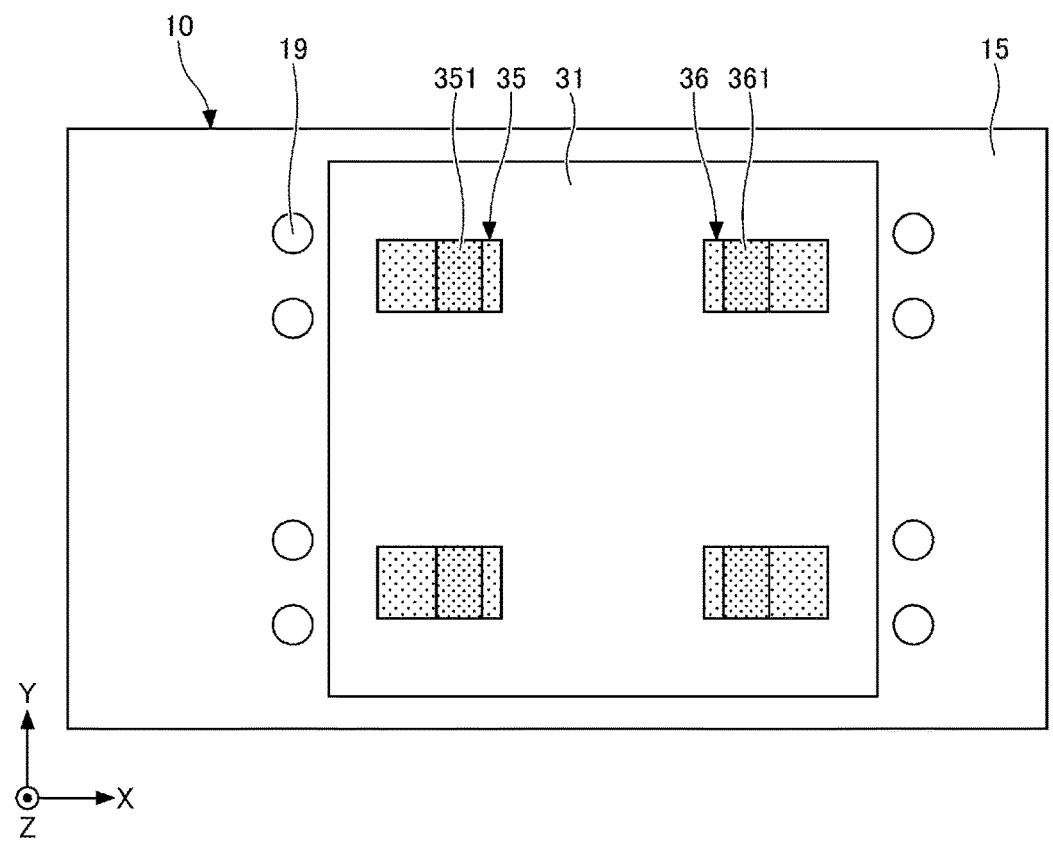

Next, in processes or steps illustrated in FIG. 5A and FIG. 5B, the first metallic film 351 is formed on at least the inclined surface 35a of the first metallic film forming protrusion 35, and the second metallic film 361 is formed on at least the inclined surface 36a of the second metallic film forming protrusion 36. The first metallic film 351 and the second metallic film 361 can be formed by sputtering or depositing gold, for example. Portions of the first metallic film 351 and the second metallic film 361 may be formed on the upper surfaces of the first metallic film forming protrusion 35 and the second metallic film forming protrusion 36, and the upper surface of the first cladding layer 31. Although two pairs of the first metallic film forming protrusion 35 and the second metallic film forming protrusion 36 are formed in this example (that is, an upper pair of the first and second metallic film forming protrusions 35 and 36 in FIG. 5B, and a lower pair of the first and second metallic film forming protrusions 35 and 36 in FIG. 5B), only one pair, or three or more pairs of the first metallic film forming protrusion 35 and the second metallic film forming protrusion 36 may be formed.

Figure 6A:
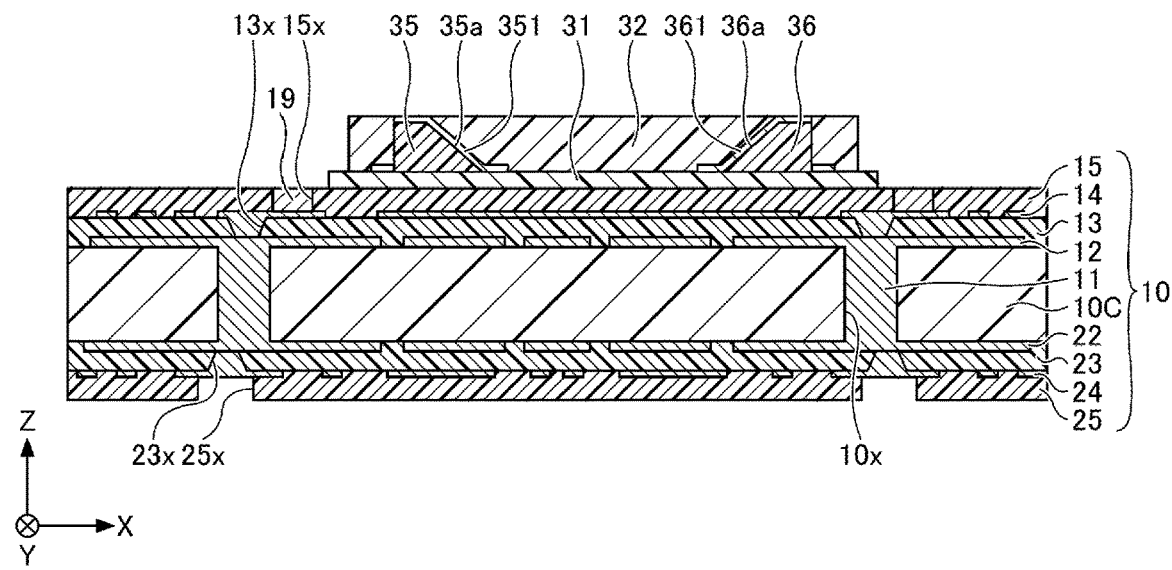
FIG. 6A and FIG. 6B are diagrams (part 4) illustrating the example of the manufacturing processes of the substrate with the optical waveguide according to the first embodiment.
Figure 6B:
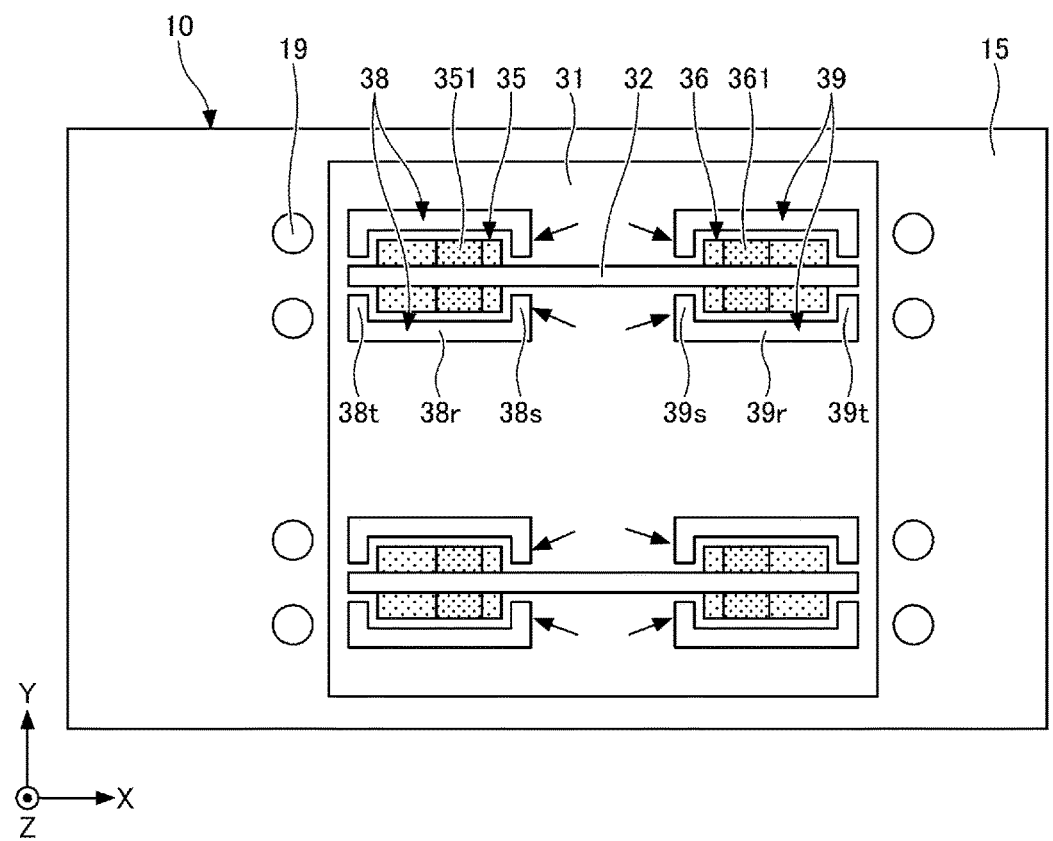

Next, in processes or steps illustrated in FIG. 6A and FIG. 6B, the core layer 32 is formed of a photosensitive resin on the upper surface of the first cladding layer 31, so as to cover a portion of the first metallic film 351 and a portion of the second metallic film 361. In addition, the pair of first protrusions 38, protruding from the upper surface of the first cladding layer 31, is formed of a photosensitive resin on the upper surface of the first cladding layer 31, so as to be separated from the core layer 32 and the first metallic film forming protrusions 35, with the core layer 32 sandwiched between the pair of first protrusions 38 in the plan view. Further, the pair of second protrusions 39, protruding from the upper surface of the first cladding layer 31, is formed of a photosensitive resin on the upper surface of the first cladding layer 31, so as to be separated from the core layer 32 and the second metallic film forming protrusions 36, with the core layer 32 sandwiched between the pair of second protrusions 39 in the plan view.

The core layer 32, the first protrusion 38, and the second protrusion 39 are formed by disposing an uncured photosensitive resin film on the first cladding layer 31, and performing exposing and developing processes using the same mask, for example. The upper surface of the core layer 32 coincides with the upper surfaces of the first metallic film 351 and the second metallic film 361, for example. The upper surfaces of the first metallic film 351 and the second metallic film 361 may be exposed from the core layer 32. In this example, the two core layers 32 are elongated in the longitudinal direction, that is, the X-direction, and the two elongated core layers 32 are arranged on the upper surface of the first cladding layer 31. However, the arrangement of the core layer 32 is not limited to such, and the core layer 32 may be formed in correspondence with the number of pairs of the first metallic film forming protrusions 35 and the second metallic film forming protrusions 36, for example.

Next, a case where the first protrusion 38 and the second protrusion 39 are not formed, will be considered. The developer is used when developing the core layer 32. Although the developer flows in various directions, the developer, mainly flowing in directions of arrows in FIG. 6B toward the first metallic film 351 and the second metallic film 361, reaches the first metallic film 351 and the second metallic film 361 exposed from the core layer 32. In this case, the first metallic film 351 and the second metallic film 361 exposed from the core layer 32 may become stripped or detached due to erosion caused by the developer. In the case where the first metallic film 351 and the second metallic film 361 exposed from the core layer 32 become stripped, the stripping may also affect the first metallic film 351 and the second metallic film 361 covered with the core layer 32, to thereby generate an optical loss.

On the other hand, in the substrate 1 with optical waveguide, because the first protrusion 38 and the second protrusion 39 are formed, it is possible to reduce the problem described above. That is, because the first protrusion 38 and the second protrusion 39 function as dams with respect to the developer flowing in the directions of arrows or the like in FIG. 6B, the amount of the developer reaching the first metallic film 351 and the second metallic film 361 can be significantly reduced. Accordingly, the first metallic film 351 and the second metallic film 361 exposed from the core layer 32 are less likely affected by the erosion caused by the developer, and it is thus possible to reduce stripping of the first metallic film 351 and the second metallic film 361. As a result, it is possible to prevent the stripping of the first metallic film 351 and the second metallic film 361 exposed from the core layer 32 from affecting the first metallic film 351 and the second metallic film 361 covered with the core layer 32, and causing the optical loss. The effect of the dam with respect to the developer is greatly dependent on the second portion 38s of the first protrusion 38 and the second portion 39s of the second protrusion 39.

Figure 7:
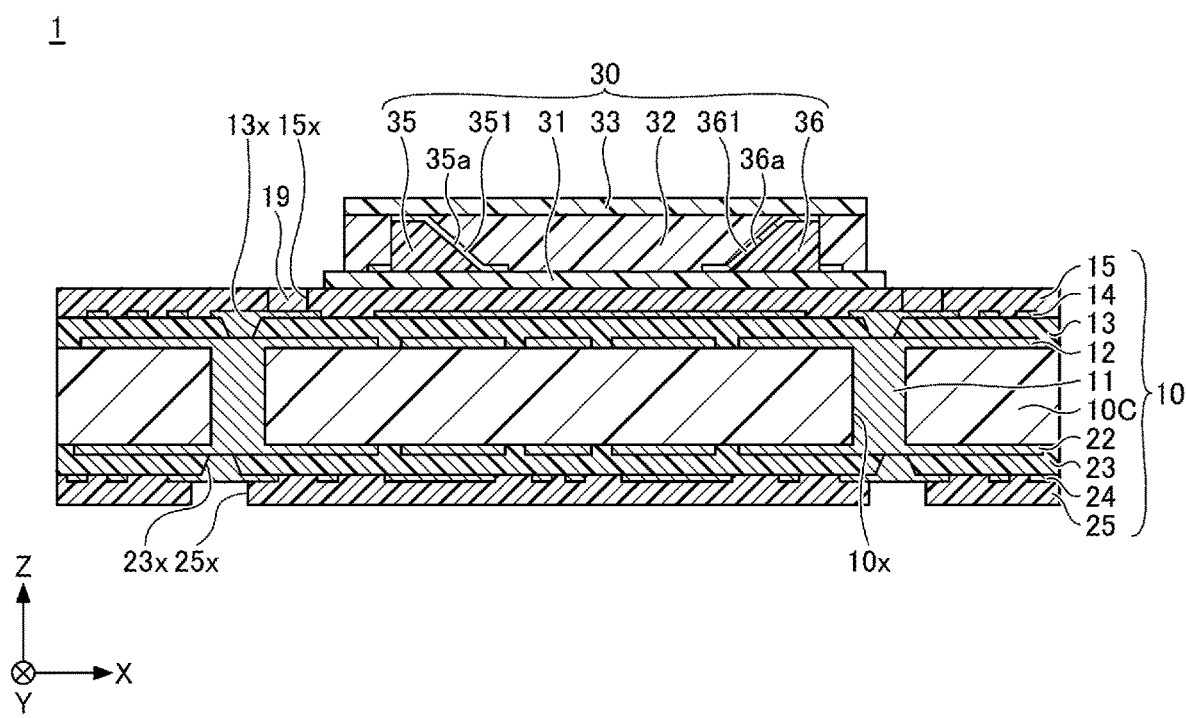
FIG. 7 is a diagram (part 5) illustrating the example of the manufacturing processes of the substrate with the optical waveguide according to the first embodiment.

Next, in a process or step illustrated in FIG. 7, the second cladding layer 33 is laminated on the core layer 32. The second cladding layer 33 can be formed in a predetermined pattern, by disposing an uncured photosensitive resin film on the upper surface of the first cladding layer 31, so as to cover at least the upper surface and both side surfaces of the core layer 32, and exposing and developing the resin film. By the processes or steps described above, the substrate 1 with optical waveguide, having the optical waveguide 30 provided on the wiring substrate 10, is completed.

As described above, in the substrate 1 with optical waveguide, because the first protrusion 38 and the second protrusion 39 are formed in the same process or step as the core layer 32, it is possible to reduce the stripping of the first metallic film 351 or the second metallic film 361 caused by the developer. As a result, it is possible to reduce the optical loss caused by the stripping of the first metallic film 351 or the second metallic film 361.

In each protrusion, the first portion, the second portion, and the third portion do not necessarily have to be parallel to the X-direction or the Y-direction in the plan view. In addition, in the plan view, the first portion, the second portion, and the third portion do not necessarily have to be linear, and some or all of the first, second, and third portions may be bent or curved.

Although the first metallic film forming protrusion 35 and the second metallic film forming protrusion 36 are provided in the present embodiment, only one of the first metallic film forming protrusion 35 and the second metallic film forming protrusion 36 may be provided.

Modifications of First Embodiment

In modifications of the first embodiment, other examples of the planar shape of the protrusion are illustrated. In the modifications of the first embodiment, a description of the parts that are the same as those of the embodiment described above may be omitted.

Figure 8A:
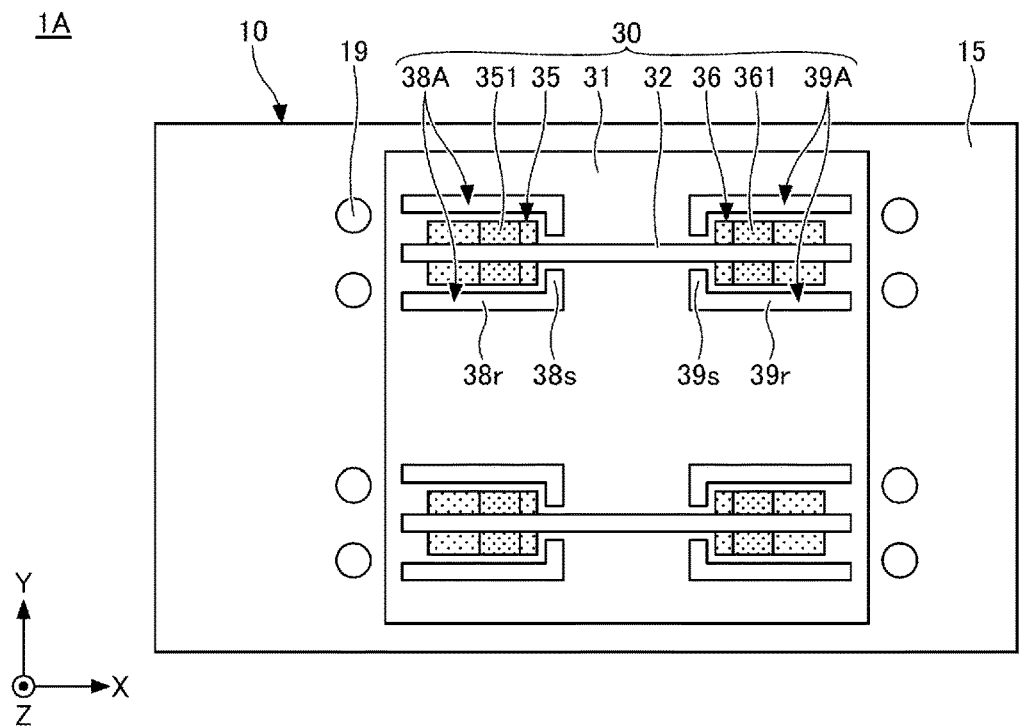
FIG. 8A and FIG. 8B are plan views illustrating examples of the structure of the substrate with optical waveguide according to modifications of the first embodiment.
Figure 8B:
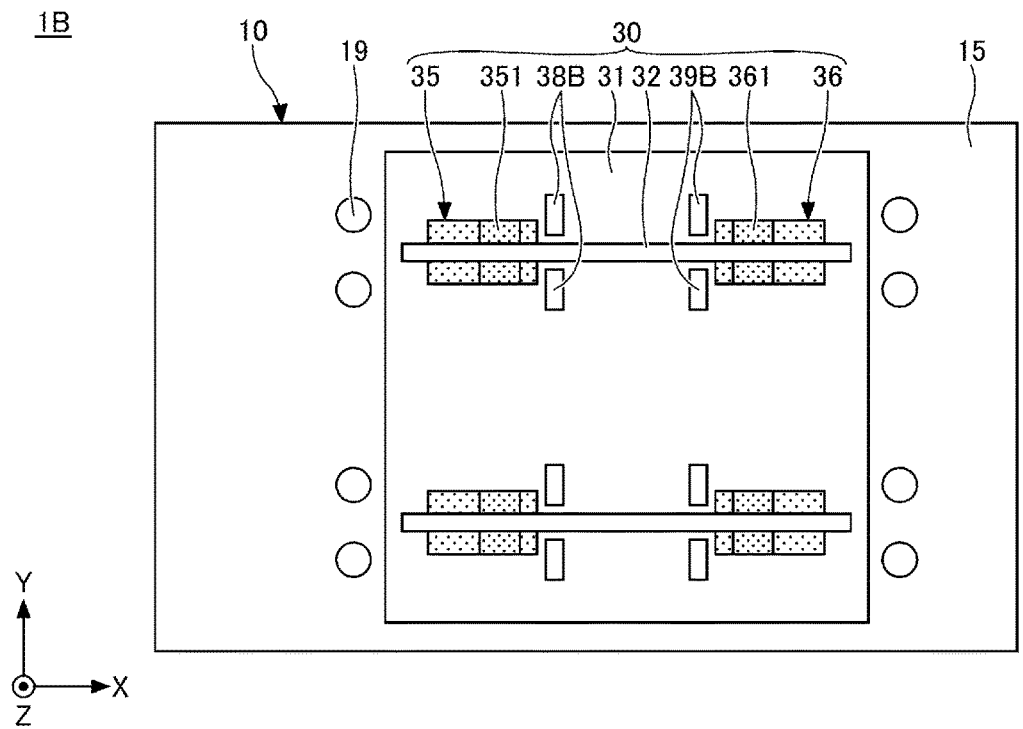

FIG. 8A and FIG. 8B are plan views illustrating examples of the structure of the substrate with optical waveguide according to the modifications of the first embodiment. In FIG. 8A and FIG. 8B, the illustration of the second cladding layer 33 is omitted. A substrate 1A with optical waveguide illustrated in FIG. 8A differs from the substrate 1 with optical waveguide (refer to FIG. 1A, FIG. 1B or the like) in that the first protrusion 38 and the second protrusion 39 are replaced with a first protrusion 38A and a second protrusion 39A, respectively.

The first protrusion 38A includes the first portion 38r and the second portion 38s, but unlike the first protrusion 38, does not include the third portion 38t. The second protrusion 39A includes the first portion 39r and the second portion 39s, but unlike the second protrusion 39, does not include the third portion 39t.

In the example illustrated in FIG. 8A, the first wide portion 35c and the second wide portion 35d have a rectangular shape in the plan view, one of the first protrusions 38A has portions opposing two sides of the rectangular shape of the first wide portion 35c in the plan view, and the other of the first protrusions 38A has portions opposing two sides of the rectangular shape of the second wide portion 35d in the plan view. The second protrusion 39A has the same shape as the first protrusion 38A.

A substrate 1B with optical waveguide illustrated in FIG. 8B differs from the substrate 1 with optical waveguide (refer to FIG. 1A, FIG. 1B or the like) in that the first protrusion 38 and the second protrusion 39 are replaced with a first protrusion 38B and a second protrusion 39B, respectively.

The first protrusion 38B only has a portion corresponding to the second portion 38s of the first protrusion 38. Further, the second protrusion 39B only has a portion corresponding to the second portion 39s of the second protrusion 39.

In the example illustrated in FIG. 8B, the first wide portion 35c and the second wide portion 35d have a rectangular shape in the plan view, one of the first protrusions 38B has a portion opposing one side of the rectangular shape of the first wide portion 35c in the plan view, and the other of the first protrusions 38B has a portion opposing one side of the rectangular shape of the second wide portion 35d in the plan view. The second protrusion 39B has the same shape as the first protrusion 38B.

In the substrates 1, 1A, and 1B with optical waveguide, when the first metallic film 351 is viewed in the direction perpendicular to the end surface of the core layer 32, one first protrusion at least has a portion corresponding to the second portion overlapping the first metallic film 351 formed in the first wide portion, and the other first protrusion at least has a portion corresponding to the second portion overlapping the first metallic film 351 formed in the second wide portion. In addition, when the second metallic film 361 is viewed in the direction perpendicular to the end surface of the core layer 32, one second protrusions at least has a portion corresponding to the second portion overlapping the second metallic film 361 formed in the third wide portion, and the other second protrusion at least has a portion corresponding to the second portion overlapping the second metallic film 361 formed in the fourth wide portion.

According to this structure, it is possible to effectively reduce the stripping of the first metallic film 351 or the second metallic film 361 caused by the developer flowing in the directions of the arrows in FIG. 6B. As a result, it is possible to reduce the optical loss caused by the stripping of the first metallic film 351 or the second metallic film 361. In a case where the erosion caused by the developer flowing in directions other than the directions of the arrows in FIG. 6B becomes a problem, it is preferable to further provide the first portion and the third portion in addition to the second portion. In this case, it becomes possible to effectively reduce the stripping of the first metallic film 351 or the second metallic film 361 caused by the developer flowing in various directions.

Second Embodiment

In a second embodiment, an example of an optical communication device including the substrate with optical waveguide according to the first embodiment, and a light emitting element that emits light to the optical waveguide of the substrate with optical waveguide, or a light receiving element that receives light emitted from the optical waveguide of the substrate with optical waveguide, or both the light emitting element and the light receiving element, will be described. In the second embodiment, a description of the parts that are the same as those corresponding parts of the embodiment described above may be omitted.

Figure 9:
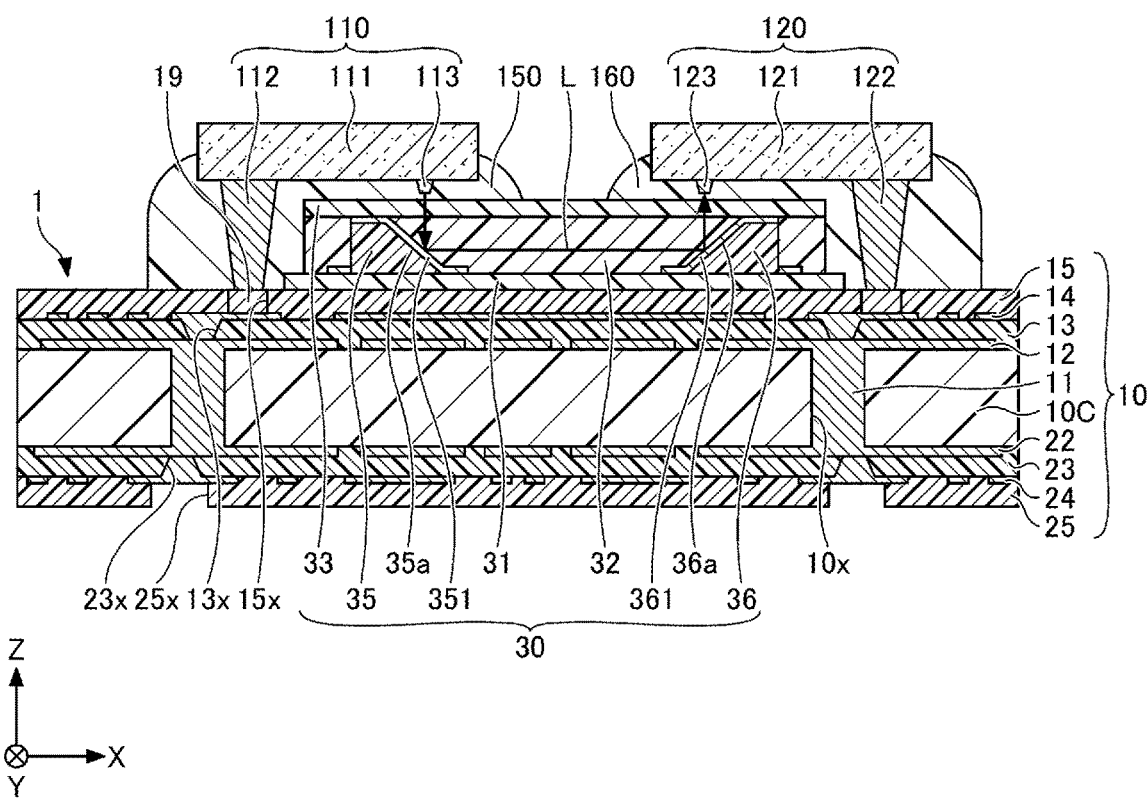
FIG. 9 is a cross sectional view illustrating an example of an optical transceiver according to a second embodiment.

FIG. 9 is a cross sectional view illustrating an example of an optical transceiver according to a second embodiment. As illustrated in FIG. 9, an optical transceiver 5 includes the substrate 1 with optical waveguide, a light emitting element 110, a light receiving element 120, and underfill resins 150 and 160.

The light emitting element 110 includes a main body 111, bumps 112, and a light emitting portion 113, and emits light to the optical waveguide 30. The bumps 112 and the light emitting portion 113 are provided on a surface (bottom surface in FIG. 9) of the main body 111 closer to the wiring substrate 10. The bumps 112 are Au bumps, for example, and are electrically connected to the external connection terminals 19 of the wiring substrate 10. The light emitting portion 113 is disposed at a position capable of irradiating light on the first metallic film 351. A vertical cavity surface emitting laser (VCSEL), a light emitting diode (LED), or the like can be used for the light emitting element 110, for example.

The underfill resin 150 is provided between the light emitting element 110 and each of a portion of the solder resist layer 15 and a portion of the optical waveguide 30. An optically transparent resin (or light-transmitting resin), that can transmit light emitted from the light emitting element 110, can be used for the underfill resin 150, for example.

The light receiving element 120 includes a main body 121, bumps 122, and a light receiving portion 123, and receives light emitted from the optical waveguide 30. The bumps 122 and the light receiving portion 123 are provided on the surface (bottom surface in FIG. 9) of the main body 121 closer to the wiring substrate 10. The bumps 122 are Au bumps, for example, and are electrically connected to the external connection terminals 19 of the wiring substrate 10. The light receiving portion 123 is disposed at a position capable of receiving the light reflected by the second metallic film 361. A photodiode, an avalanche photodiode (APD), or the like can be used for the light receiving element 120, for example.

The underfill resin 160 is provided between the light receiving element 120 and each of a portion of the solder resist layer 15 and a portion of the optical waveguide 30. An optically transparent resin (or light-transmitting resin), that can transmit light received by the light receiving element 120, can be used for the underfill resin 160, for example.

In FIG. 9, light L emitted from the light emitting portion 113 of the light emitting element 110 is transmitted through the underfill resin 150 and the second cladding layer 33 and into the core layer 32, reaches the first metallic film 351 to be totally reflected by the first metallic film 351, and a light propagation direction thereof is converted by approximately 90 degrees. Then, the light propagates through the core layer 32, reaches the second metallic film 361 to be totally reflected by the second metallic film 361, and a light propagation direction thereof is converted by approximately 90 degrees. Further, the light exits the core layer 32, passes through the second cladding layer 33 and the underfill resin 160, and is received by the light receiving portion 123 of the light receiving element 120.

Because the optical transceiver 5 includes the optical waveguide 30, the optical transceiver 5 can have a small optical loss.

Figure 10:
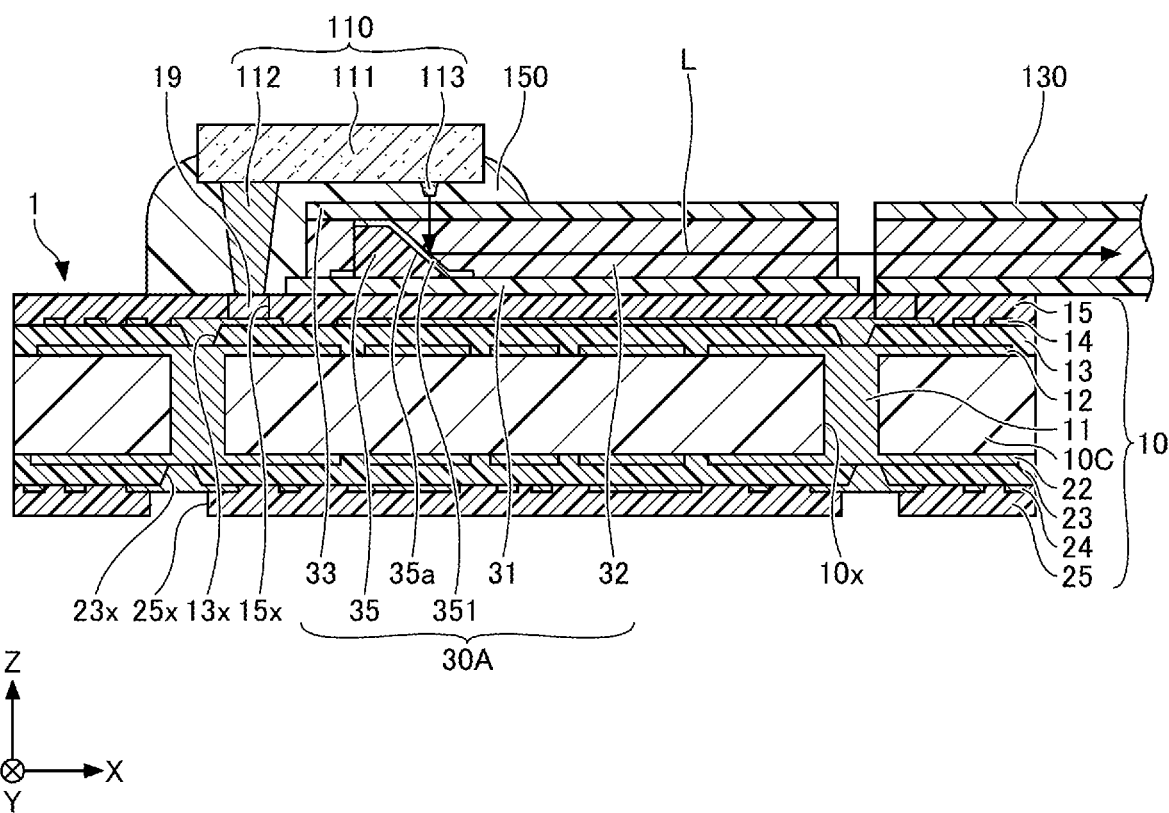
FIG. 10 is a cross sectional view illustrating an example of the optical transceiver according to a modification of the second embodiment.

FIG. 10 is a cross sectional view illustrating an example of the optical transceiver according to a modification of the second embodiment. As illustrated in FIG. 10, an optical transceiver 6 differs from the optical transceiver 5 illustrated in FIG. 9, in that the optical waveguide 30 are replaced with an optical waveguide 30A and an optical fiber 130 for signal transmission is provided in place of the light receiving element 120.

The optical waveguide 30A differs from the optical waveguide 30, in that the optical waveguide 30A does not include the second metallic film forming protrusion 36 and the second metallic film 361. The optical fiber 130 is disposed on the solder resist layer 15 of the wiring substrate 10, so that an incident surface of the optical fiber 130 opposes an end surface of the optical waveguide 30A on the side farther away from the first metallic film 351 with a slight gap formed therebetween. An optical axis of the optical fiber 130 coincides with an optical axis of the optical waveguide 30A.

The light L from the light emitting portion 113 of the light emitting element 110, vertically incident to the optical waveguide 30A, is reflected by the first metallic film 351 at a 90 degree angle, passes through the core layer 32 of the optical waveguide 30A, and becomes incident to the optical fiber 130 from the end surface of the optical waveguide 30A, to thereby transmit an optical signal. The light emitting element 110 may be replaced with a light receiving element, so that the light incident to the optical waveguide 30A from the optical fiber 130 is reflected by the first metallic film 351 at a 90 degree angle, and is received by the light receiving element.

Because the optical transceiver 6 includes the optical waveguide 30A, the optical transceiver 6 can have a small optical loss.

Accordingly to each of the embodiments described above, it is possible to provide a substrate with an optical waveguide having a structure capable of preventing a metallic film from easily becoming stripped or detached.

Various aspects of the subject-matter described herein may be set out non-exhaustively in the following numbered clauses:

1. A method for manufacturing a substrate with optical waveguide, comprising:
   forming a first cladding layer on a wiring substrate;
   forming, on an upper surface of the first cladding layer, a first metallic film forming protrusion including an inclined surface that is inclined with respect to the upper surface of the first cladding layer;
   forming a first metallic film on at least the inclined surface of the first metallic film forming protrusion;
   forming a core layer made of a photosensitive resin on the upper surface of the first cladding layer, so as to cover a portion of the first metallic film; and
   forming a pair of first protrusions made of a photosensitive resin, on the upper surface of the first cladding layer with the core layer interposed therebetween in a plan view, and protruding from the upper surface of the first cladding layer, so as to be separated from the core layer and the first metallic film forming protrusion, wherein
   the first metallic film forming protrusion includes a first central portion overlapping the core layer in the plan view, a first wide portion extending from the first central portion and protruding from one side surface of the core layer, and a second wide portion extending from the first central portion and protruding from the other side surface of the core layer,
   when the first metallic film is viewed in a direction perpendicular to an end surface of the core layer, the core layer overlaps the first metallic film formed at the first central portion, and one of the pair of first protrusions includes a portion overlapping the first metallic film formed at the first wide portion, and the other of the pair of first protrusions includes a portion overlapping the first metallic film formed at the second wide portion, and
   the core layer and the pair of first protrusions are formed by performing exposure and development using the same mask.

2. The method for manufacturing the substrate with optical waveguide according to clause 1, further comprising:
   forming on the upper surface of the first cladding layer a second metallic film forming protrusion including an inclined surface that is inclined with respect to the upper surface of the first cladding layer;
   forming a second metallic film on at least the inclined surface of the second metallic film forming protrusion; and
   forming a pair of second protrusions on the upper surface of the first cladding layer with the core layer interposed therebetween in the plan view, and protruding from the upper surface of the first cladding layer, so as to be separated from the core layer and the second metallic film forming protrusion, wherein
   the pair of second protrusions is formed of a photosensitive resin,
   the second metallic film forming protrusion includes a second central portion overlapping the core layer in the plan view, a third wide portion extending from the second central portion and protruding from the one side surface of the core layer, and a fourth wide portion extending from the second central portion and protruding from the other side surface of the core layer,
   when the second metallic film is viewed in the direction perpendicular to the end surface of the core layer, the core layer overlaps the second metallic film formed at the second central portion, one of the pair of second protrusions includes a portion overlapping the second metallic film formed at the third wide portion, and the other of the pair of second protrusions includes a portion overlapping the second metallic film formed at the fourth wide portion.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A substrate with optical waveguide, comprising:
   a wiring substrate; and
   an optical waveguide formed on the wiring substrate, wherein the optical waveguide includes
   a first cladding layer,
   a first metallic film forming protrusion, formed on an upper surface of the first cladding layer, and including an inclined surface that is inclined with respect to the upper surface of the first cladding layer,
   a first metallic film formed on at least the inclined surface of the first metallic film forming protrusion,
   a core layer formed on the upper surface of the first cladding layer so as to cover a portion of the first metallic film,
   a second cladding layer formed on the upper surface of the first cladding layer, so as to cover at least an upper surface and both side surfaces of the core layer, and
   a pair of first protrusions, formed on the upper surface of the first cladding layer with the core layer interposed therebetween in a plan view, and protruding from the upper surface of the first cladding layer, so as to be separated from the core layer and the first metallic film forming protrusion, wherein
   the core layer and the pair of first protrusion are formed of a photosensitive resin,
   the first metallic film forming protrusion includes a first central portion overlapping the core layer in the plan view, a first wide portion extending from the first central portion and protruding from one side surface of the core layer, and a second wide portion extending from the first central portion and protruding from the other side surface of the core layer, and
   when the first metallic film is viewed in a direction perpendicular to an end surface of the core layer, the core layer overlaps the first metallic film formed at the first central portion, and one of the pair of first protrusions includes a portion overlapping the first metallic film formed at the first wide portion, and the other of the pair of first protrusions includes a portion overlapping the first metallic film formed at the second wide portion.

2. The substrate with optical waveguide as claimed in claim 1, wherein a height of the core layer and a height of the pair of first protrusions, with reference to the upper surface of the first cladding layer, are the same.

3. An optical communication device comprising:
   the substrate with optical waveguide as claimed in claim 2; and
   at least one of a light emitting element that emits light to the optical waveguide, and a light receiving element that receives light emitted from the optical waveguide.

4. The substrate with optical waveguide as claimed in claim 1, wherein a material forming the core layer, and a material forming the pair of first protrusions, are the same.

5. An optical communication device comprising:
   the substrate with optical waveguide as claimed in claim 4; and
   at least one of a light emitting element that emits light to the optical waveguide, and a light receiving element that receives light emitted from the optical waveguide.

6. The substrate with optical waveguide as claimed in claim 1, wherein
   the one of the pair of first protrusions is formed along a portion of an outer edge of the first wide portion in the plan view, and
   the other of the pair of first protrusions is formed along a portion of an outer edge of the second wide portion in the plan view.

7. The substrate with optical waveguide as claimed in claim 1, wherein
   the first wide portion and the second wide portion have a rectangular shape in the plan view,
   the one of the pair of first protrusions has portions opposing two sides of the rectangular shape of the first wide portion in the plan view, and
   the other of the pair of first protrusions has portions opposing two sides of the rectangular shape of the second wide portion in the plan view.

8. The substrate with optical waveguide as claimed in claim 7, wherein
   the one of the pair of first protrusions has portions opposing three sides of the rectangular shape of the first wide portion in the plan view, and
   the other of the pair of first protrusions has portions opposing three sides of the rectangular shape of the second wide portion in the plan view.

9. The substrate with optical waveguide as claimed in claim 1, wherein the optical waveguide further includes
   a second metallic film forming protrusion, formed on the upper surface of the first cladding layer, and including an inclined surface that is inclined with respect to the upper surface of the first cladding layer,
   a second metallic film formed on at least the inclined surface of the second metallic film forming protrusion, and
   a pair of second protrusions, formed on the upper surface of the first cladding layer with the core layer interposed therebetween in the plan view, and protruding from the upper surface of the first cladding layer, so as to be separated from the core layer and the second metallic film forming protrusion, wherein
   the pair of second protrusions is formed of a photosensitive resin,
   the second metallic film forming protrusion includes a second central portion overlapping the core layer in the plan view, a third wide portion extending from the second central portion and protruding from the one side surface of the core layer, and a fourth wide portion extending from the second central portion and protruding from the other side surface of the core layer, and
   when the second metallic film is viewed in the direction perpendicular to the end surface of the core layer, the core layer overlaps the second metallic film formed at the second central portion, one of the pair of second protrusions includes a portion overlapping the second metallic film formed at the third wide portion, and the other of the pair of second protrusions includes a portion overlapping the second metallic film formed at the fourth wide portion.

10. An optical communication device comprising:
    the substrate with optical waveguide as claimed in claim 9; and
    at least one of a light emitting element that emits light to the optical waveguide, and a light receiving element that receives light emitted from the optical waveguide.

11. The substrate with optical waveguide as claimed in claim 9, wherein
    materials forming the core layer, the first protrusion, and the second protrusion are the same, and
    shapes of the pair of second protrusions and the pair of first protrusions are the same.

12. The substrate with optical waveguide as claimed in claim 1, wherein
- both the side surfaces of the core layer extend in a longitudinal direction of the core layer, and
- the end surface of the core layer extends in a short direction of the core layer perpendicular to the longitudinal direction.

13. An optical communication device comprising:
- the substrate with optical waveguide as claimed in claim 1; and
- at least one of a light emitting element that emits light to the optical waveguide, and a light receiving element that receives light emitted from the optical waveguide.

* * * * *